United States Patent [19]

Firestone

[11] Patent Number: 4,569,724
[45] Date of Patent: Feb. 11, 1986

[54] SEALING MEANS FOR A VACUUM DISTILLATION APPARATUS

[76] Inventor: Raymond A. Firestone, 60 Hunter Ave., Fanwood, N.J. 07023

[21] Appl. No.: 430,812

[22] Filed: Sep. 30, 1982

[51] Int. Cl.⁴ ............................................. B01D 3/10
[52] U.S. Cl. .................................... 202;205; 202/238; 202/269; 203/91; 159/DIG. 42
[58] Field of Search ............... 202/269, 205, 238, 237; 159/DIG. 42; 203/DIG. 2, 91; 277/64, DIG. 8, 65

[56] References Cited

U.S. PATENT DOCUMENTS

| 2,270,927 | 1/1942 | Browne | 277/DIG. 8 |
| 2,450,098 | 9/1948 | Smith | 202/205 |
| 2,843,535 | 7/1958 | Zaugg | 202/205 |
| 3,206,217 | 9/1965 | Shepard et al. | 277/64 |
| 3,342,696 | 9/1967 | Bush | 202/238 |
| 3,643,964 | 2/1972 | Snelling et al. | 277/64 |

FOREIGN PATENT DOCUMENTS

| 0726457 | 1/1966 | Canada | 277/DIG. 8 |
| 2178755 | 11/1973 | France | 202/238 |

Primary Examiner—S. Leon Bashore
Assistant Examiner—V. Manoharan
Attorney, Agent, or Firm—Mario A. Monaco

[57] ABSTRACT

A sealing means for a vacuum distillation apparatus is provided having a vapor tube rotatably and sealably mounted within a vacuum tube through which vapor passes.

5 Claims, 2 Drawing Figures

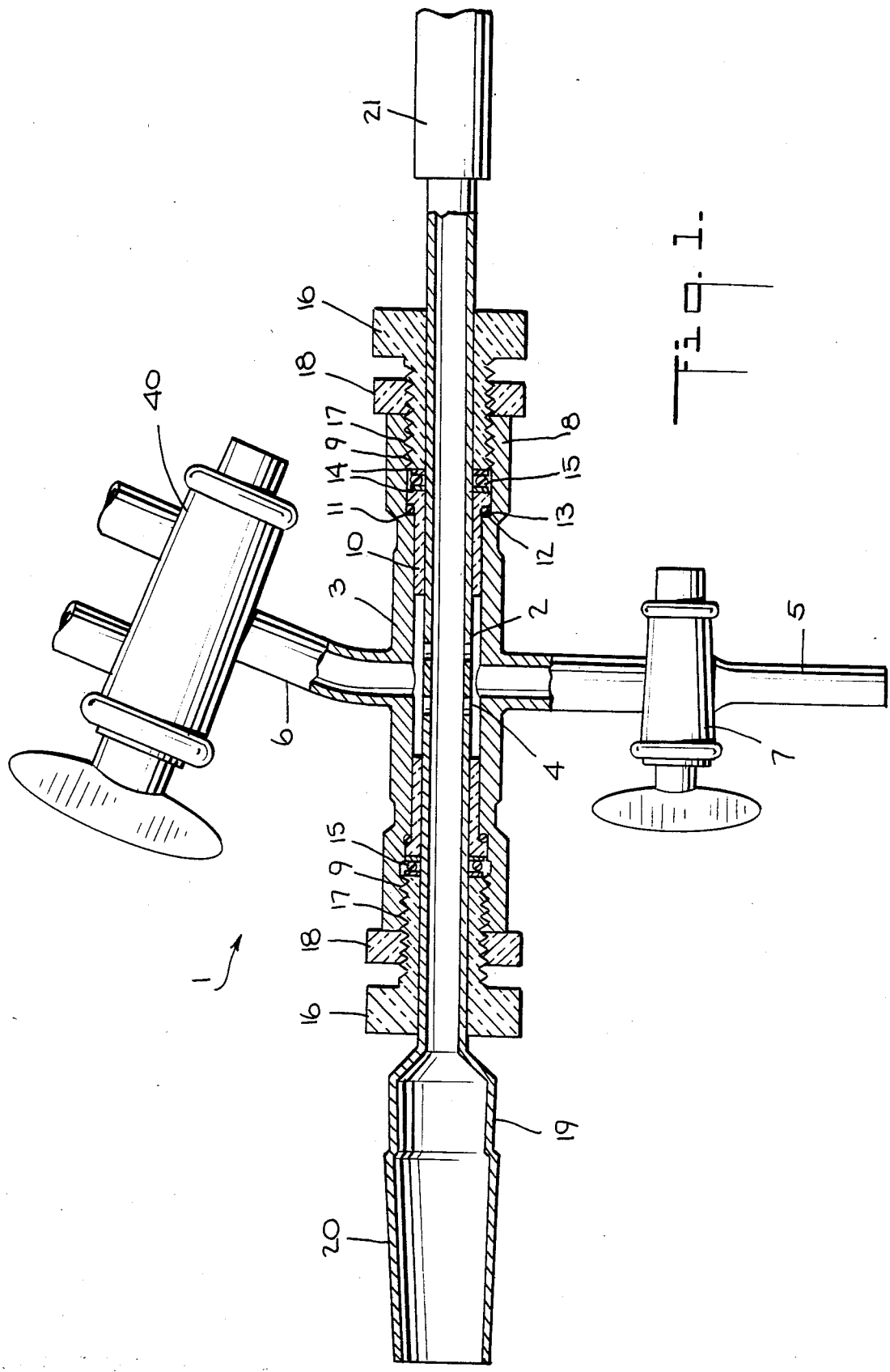

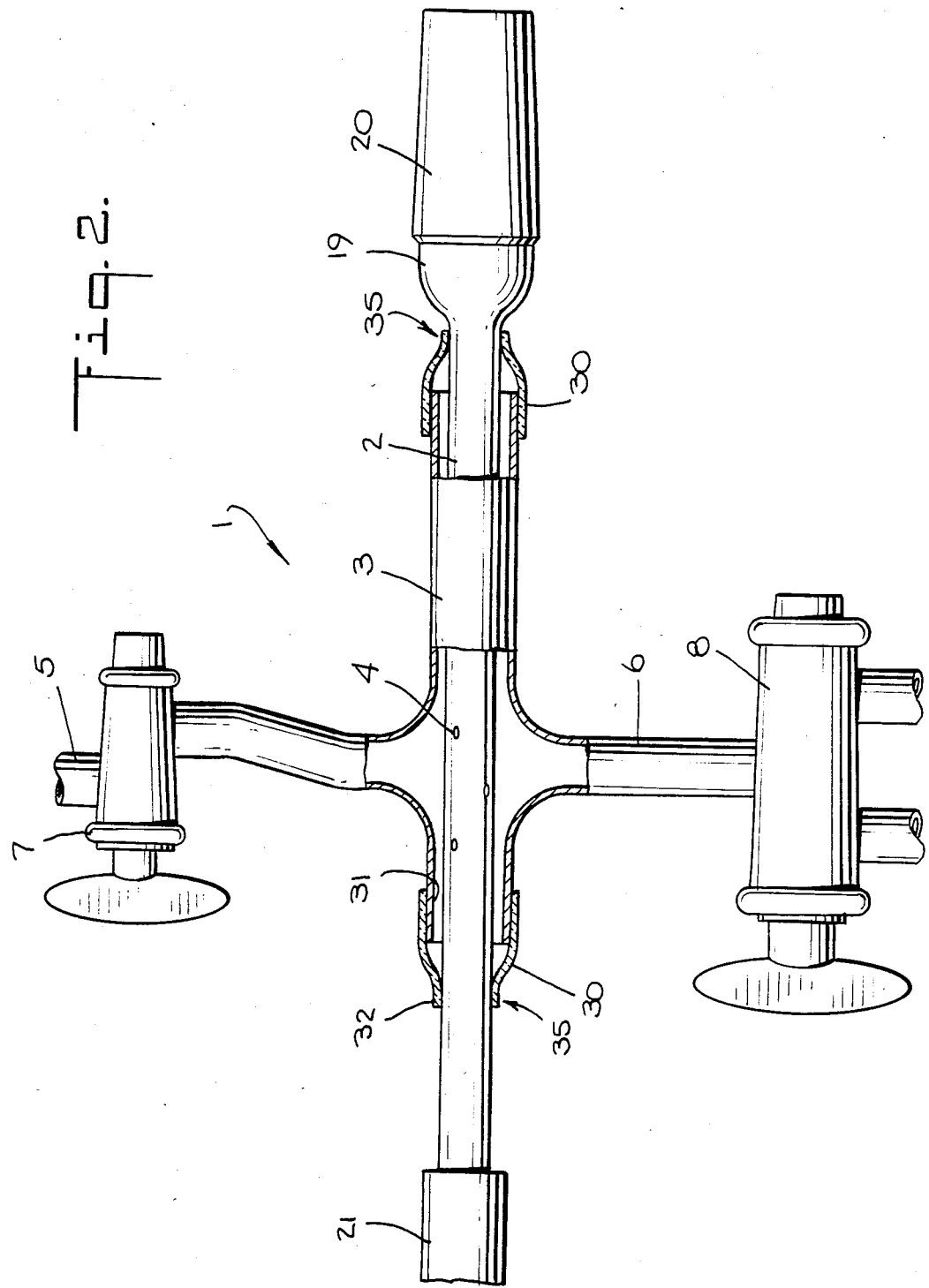

SEALING MEANS FOR A VACUUM DISTILLATION APPARATUS

BACKGROUND AND SUMMARY OF THE INVENTION

Previous vacuum distillation apparatus have been cumbersome and have involved complex sealing means to seal the vapor tube from the vacuum tube so that none of the vapor would leak to the atmosphere.

My invention provides a simplified vacuum distillation apparatus wherein the vapor tube is rotatably and sealably mounted within a vacuum tube whereby the creation of a vacuum actually enhances the sealing mechanism so that vapor cannot escape to the atmosphere nor can vacuum be lost.

Also, according to my invention, there is provided a vacuum distillation apparatus which can be replaced or easily disassembled for cleaning and/or replacement of various parts.

Thus, it is an object of my invention to provide a vacuum distillation apparatus which basically comprises a vapor tube rotatably and sealably mounted within a vacuum tube through which vapor can be distilled. It is another object of my invention to provide a vacuum distillation apparatus which is not complex and which can be easily disassembled to clean and replace worn or broken parts.

To better describe my invention, there are provided two figures.

FIG. 1 shows one particular embodiment of the vacuum distillation apparatus of this invention showing a cross section view of a typical vacuum distillation apparatus.

FIG. 2 represents another embodiment of my invention showing a cross section view of a vacuum distillation apparatus.

Referring now to FIG. 1, there is provided a vacuum distillation apparatus (1) comprising a vapor tube (2) enclosed within a vacuum tube (3). The vapor tube (2) is provided with holes therein through which a vapor to be distilled or evaporated can pass. Vacuum tube (3) has ports (5) and (6) thereon which can be provided with a stopcock (7) or a double stopcock (4) or any other suitable closing means, through which the vacuum can be provided from a convenient source. Vacuum tube (3) has on each end a concentric raised portion (8) which is threaded with threads (9) on the interior therein. This concentric raised portion can be provided on both sides of said vacuum tube, and this is shown in FIG. 1 as such. The vapor tube (2) is long enough to extend through both ends of the raised portion (8) of the vacuum tube (3). There is provided a bearing or sleeve (10) through which said vacuum tube passes. The bearing (10), which can be made of teflon or other suitable material, has a lip portion (11) which can rest against the projection (12) of the concentric raised portion (8) of the vacuum tube. Although the bearing (10) provides a suitable seal itself, one can insert within the space between lip (11) and projection (12) an O ring (13) to provide a better seal for the rotation of the vapor tube within the vacuum tube. To further additionally insure a good seal, there are provided a pair of concentric rings made of teflon or other suitable material labeled (14) in FIG. 1 and being sandwiched between said rings (14) is an O ring (15). The O rings (13) and (15) can be made of any suitable flexible material such as rubber or plastic. To urge the sealing means (14) and (15) and (10), (11), and (13) to form a tight seal, there is provided a screw cap (16) having a threaded end (17) which can be screwed into threads (9) of end piece (8) of the vacuum tube. When said cap (16) is screwed into the threads (9), it urges rings (14) against each other and it urges lip (11) against projection (12) which results in the radial expansion of O ring's (15) and (13) to effectively seal the vacuum tube from the vapor tube. Cap (16) can be provided with a secondary screw washer (18) which is threadably mounted on the cap between the end portion (16) and the screw portion (17). This secondary screw washer (18) can lock cap (16) in place to prevent loosening of cap (16) and subsequent diminishing of the seal.

On one end of vapor tube (2), there is provided a joint (19) having a ground glass portion (20) or on which a flask containing the liquid to be distilled is placed. Similarly other means for affixing the flask, such as a cork or rubber stopper, can be used. On the other end of that vapor tube (2), there is provided a motor (21) which rotatably drives the vapor tube (2) and the flask (not shown) attached onto ground joint (20) in which said liquid to be distilled is placed.

If one attaches a vacuum source to tube (5), closes off the other air outlet to atmosphere, namely tube (6), imparts a rotating motion to vapor tube (2) then, when one applies vacuum, the liquid in the flask attached onto ground joint (20) will begin to evaporate. Vapor from said liquid will pass through holes (4) and be carried out through port (5) to the vacuum source. When one applies the vacuum, it can be seen that bearing (10), having vacuum drawn against it, will slightly deform to provide a better sealing mechanism around the vapor tube (2). Bearing (10) is a concentric piece which snugly fits around vapor tube (2) but not that snug as to prevent rotation of tube (2) within the vacuum tube (3).

As can be seen when one wishes to disassemble the mechanism, one merely unscrews the cap (16) and removes said piece from the screwed end (9) of the vacuum tube. Washers (14) and O ring (15) would then disassemble themselves from the vacuum distillation apparatus, and finally bearing (10) with O ring (13) can be easily removed.

Although the same sealing mechanism is applied to both ends of said vacuum tube (3) as shown in FIG. 1, one skilled in the art will realize that the sealing mechanism incorporating the bearing (10), can be used on one end of the vacuum tube. If one uses this arrangement, a motor with a hollow shaft can be used to rotate the vapor tube with the other end of the vapor tube sealed off within the vacuum tube.

One skilled in the art would also realize that one can rotate the vacuum tube with a motor while keeping the vapor tube stationary. This arrangement can lead to a continuous feed feature whereby liquid is continuously fed through an attached vapor tube into the vessel.

Referring now to FIG. 2, which is another embodiment of my invention, there is provided a vacuum distillation apparatus (1) having a vapor tube (2) and a vacuum tube (3). Vapor tube (2) is long enough to fit and extend beyond the outer boundaries of vacuum tube (3). On one end of said vapor tube (2), there is provided a joint (19) with a ground glass portion (20) on which can be inserted a flask containing the liquid to be distilled. Other means of affixing a flask such as a cork or rubber stopper can also be used. The other end of vapor tube (2) is attached to a motor which imparts a rotating motion to the vapor tube (2). The sealing means between vapor tube (2) and vacuum tube (3) is a wide flexible ring (30) which is applied to fixedly fit around the vacuum tube at joint (31) and snugly (but not that snug to prevent rotation) around the vapor tube in an area shown as (32). The vacuum tube (3) is again provided with a projection (5) having a stopcock (7) through which a vacuum can be applied. The vacuum tube (3) can also have another projection (6) provided with a double stopcock (8) wherein vacuum can be applied or can be shut off. Other closing means in place of stopcocks (7) or (8) can be used. In operation when one drives the vapor tube in a rotatable motion and applies a vacuum at (5), any vapor in said flask will evaporate and be drawn through holes (4) out to the vacuum source. When the vapor tube (2) rotates, a seal is provided because the flexible ring (30) effectively seals off the vacuum tube and the vapor tube. The fitting at (31) between the ring (30) and the vacuum tube (31) is tight so that this end does not rotate, but the fitting on portion (32) between the sealing ring (30) and vapor tube (2) is such that the vapor tube can rotate therebetween.

As one applies a vacuum at (5), the atmospheric pressure will act and push sealing ring (30) in the direction of force shown as (35) so that said sealing ring (30) will be urged into a greater sealing position between the vapor tube (2) and the vacuum tube (3). The sealing ring (30) can be made of material such as rubber or plastic and is made such that it is flexible enough to seal the vacuum tube from the vapor tube but not that flexible as to be deformed out of shape.

In both embodiments shown in FIGS. 1 and 2, the vacuum distillation apparatus can generally be made of glass with the cap (16), the bearing (10) and the sealing ring (30) being made of materials as described.

Although I have described my invention as above, those skilled in the arts will realize that there are other ramifications and embodiments which would fall within the claims of this invention. These ramifications and other embodiments are deemed to be enclosed within said claims.

What is claimed is:

1. A sealing means for a distillation apparatus comprising:
   (a) a vacuum tube;
   (b) a vapor tube extending beyond the ends of said vacuum tube and enclosed therein, said vapor tube having holes through which vapor can pass;
   (c) means for sealing said vacuum tube and vapor tube but allowing said vapor tube to rotate therein;
   (d) means for applying a vacuum to said vacuum tube wherein one end of said vapor tube is attached to a source to provide rotating motion thereto and the other end contains means for affixing said vapor tube to a container containing the liquid to be evaporated; said vacuum also aiding in providing a seal between the vapor and vacuum tube.

2. The sealing means of claim 1 comprising a flexible ring applied fixedly to the vacuum tube and rotatably to the vapor tube, said ring sealing the vacuum tube and the vapor tube.

3. The sealing means of claim 1 comprises a bearing through which the vapor tube can rotate and a screw cap which can urge the bearing against the vacuum tube to seal the vacuum tube and vapor tube.

4. The sealing means of claim 1 comprises a bearing through which the vapor tube can rotate, an O ring for sealing the bearing and vacuum tube and a screw cap which can urge the bearing against the vacuum tube.

5. The sealing means of claim 3 wherein there is further provided an O ring and two washer rings between the bearing and the screw cap whereby a further seal is provided between the vacuum tube and the vapor tube.

* * * * *